(12) United States Patent
Robinson et al.

(10) Patent No.: US 8,028,969 B2
(45) Date of Patent: Oct. 4, 2011

(54) VALVE SEAT AND VALVE BALL FOR VACUUM SOLENOID VALVES

(75) Inventors: Frank Robinson, Belleville, MI (US); Rupert Miller, Wyandotte, MI (US)

(73) Assignee: Stoneridge, Inc., Warren, OH (US)

( * ) Notice: Subject to any disclaimer, the term of this patent is extended or adjusted under 35 U.S.C. 154(b) by 267 days.

(21) Appl. No.: 11/844,659

(22) Filed: Aug. 24, 2007

(65) Prior Publication Data

US 2008/0173839 A1 Jul. 24, 2008

Related U.S. Application Data

(60) Provisional application No. 60/823,445, filed on Aug. 24, 2006.

(51) Int. Cl.
*F16K 31/02* (2006.01)
(52) U.S. Cl. .............. 251/129.15; 251/129.14; 251/368
(58) Field of Classification Search ............ 251/129.14, 251/129.15, 366, 368
See application file for complete search history.

(56) References Cited

U.S. PATENT DOCUMENTS

| | | | |
|---|---|---|---|
| 4,474,332 A | | 10/1984 | Kaska |
| 4,714,089 A | * | 12/1987 | Ueda et al. ................ 137/614.18 |
| 4,903,938 A | | 2/1990 | Nishizawa et al. |
| 5,138,068 A | | 8/1992 | Ehrenfreund et al. |
| 6,363,920 B1 | | 4/2002 | Parker et al. |
| 6,598,853 B1 | | 7/2003 | Appleford et al. |
| 6,840,499 B2 | | 1/2005 | Ahn |

OTHER PUBLICATIONS

English language International Search Report and Written Opinion dated Apr. 23, 2008 in corresponding PCT Application No. PCT/US07/76753, 8 pgs.

* cited by examiner

*Primary Examiner* — John Fristoe, Jr.
(74) *Attorney, Agent, or Firm* — Grossman, Tucker, Perreault & Pfleger, PLLC (57) ABSTRACT

A vacuum solenoid valve may comprise a valve body defining an interior cavity and include a plurality of ports configured to be in fluid communication with the interior cavity of the valve body. One or more valve seats may be disposed about an opening between at least one of the plurality of ports and the interior cavity. One or more valve members may be configured to be moveably disposed within at least a portion of the interior cavity of the valve body and to sealingly engage with the valve member. Either the valve seat and/or the valve member may comprise a material having a higher resistance to wear and erosion compared to valve body.

22 Claims, 6 Drawing Sheets

VALVE SEAT AND VALVE BALL FOR VACUUM SOLENOID VALVES

CROSS-REFERENCE TO RELATED APPLICATIONS

This application claims the benefit of U.S. Provisional Application Ser. No. 60/823,445, filed Aug. 24, 2006, the teachings of which are incorporated herein by reference.

FIELD

The present disclosure generally relates to valve seats and valve balls for vacuum solenoid valves.

BACKGROUND

Turbochargers may improve the performance of internal combustion engines by delivering a greater mass of air to the combustion process, relative to a naturally aspirated engine, thereby allowing a greater amount of fuel to be burned during each combustion cycle and realizing an associated power increase. A turbine wheel is driven by exhaust gasses from the combustion process, and in turn drives a compressor that compresses ambient air and delivers the compressed charge of air to the engine intake to be mixed with fuel for the combustion process.

The pressure of the compressed charge of air delivered to the engine intake must be controlled to prevent over-pressurizing the engine intake, which may lead to engine damage and/or decreased engine performance. A variety of mechanisms and arrangements are commonly used for controlling the pressure of the intake charge. For example, the engine intake may include a blow-off valve which may release excess pressure from the intake manifold. On the exhaust side of the engine, a wastegate may be employed to allow at least a portion of the exhaust gasses from the engine to bypass the turbine, thereby controlling the rotational speed of the turbine and the attendant compression of the intake charge by the compressor.

A wastegate may typically include a mechanical valve which may be operated based on one or more of the turbine rotational speed, intake pressure, engine performance, intake mass air flow, etc. The mechanical valve of the wastegate may be actuated by a mechanical or an electromechanical actuator. Conveniently, a pressure or a vacuum actuator may be used to control the wastegate. Such valves rely on a vacuum source or pressurized air acting against a diaphragm, e.g., working against a spring, to open and close the wastegate.

The vacuum or pressure supplied to the wastegate actuator may be controlled by a solenoid valve, which may be controlled based on any of the foregoing parameters, to operate the wastegate to control the turbocharger boost pressure. A vacuum solenoid valve may include a vacuum and/or pressure port and a port in communication with the wastegate actuator. Often, the vacuum solenoid valve may be a molded plastic component, e.g., molded from glass reinforced nylon, including valve body having a molded valve seat and a Viton® seal. Over time, the nylon valve seat may erode, diminishing the sealing performance. Erosion may eventually lead to exposure of the glass fiber reinforcing material, which may accelerate erosion and/or generate contaminants, e.g., in the form of eroded nylon or Viton® particles, etc. Additionally, contaminants in the valve body may be driven into the nylon valve seat and/or into the Viton® seal during the operation of the valve, decreasing the sealing performance of the valve, and increasing wear or erosion. These various wear mechanisms may reduce the useful life of the valve.

BRIEF DESCRIPTION OF THE DRAWINGS

Features and advantages of the present disclosure will be apparent from the following description of embodiments consistent therewith, which description should be understood in conjunction with the accompanying drawings, wherein.

DESCRIPTION

Figure 1:
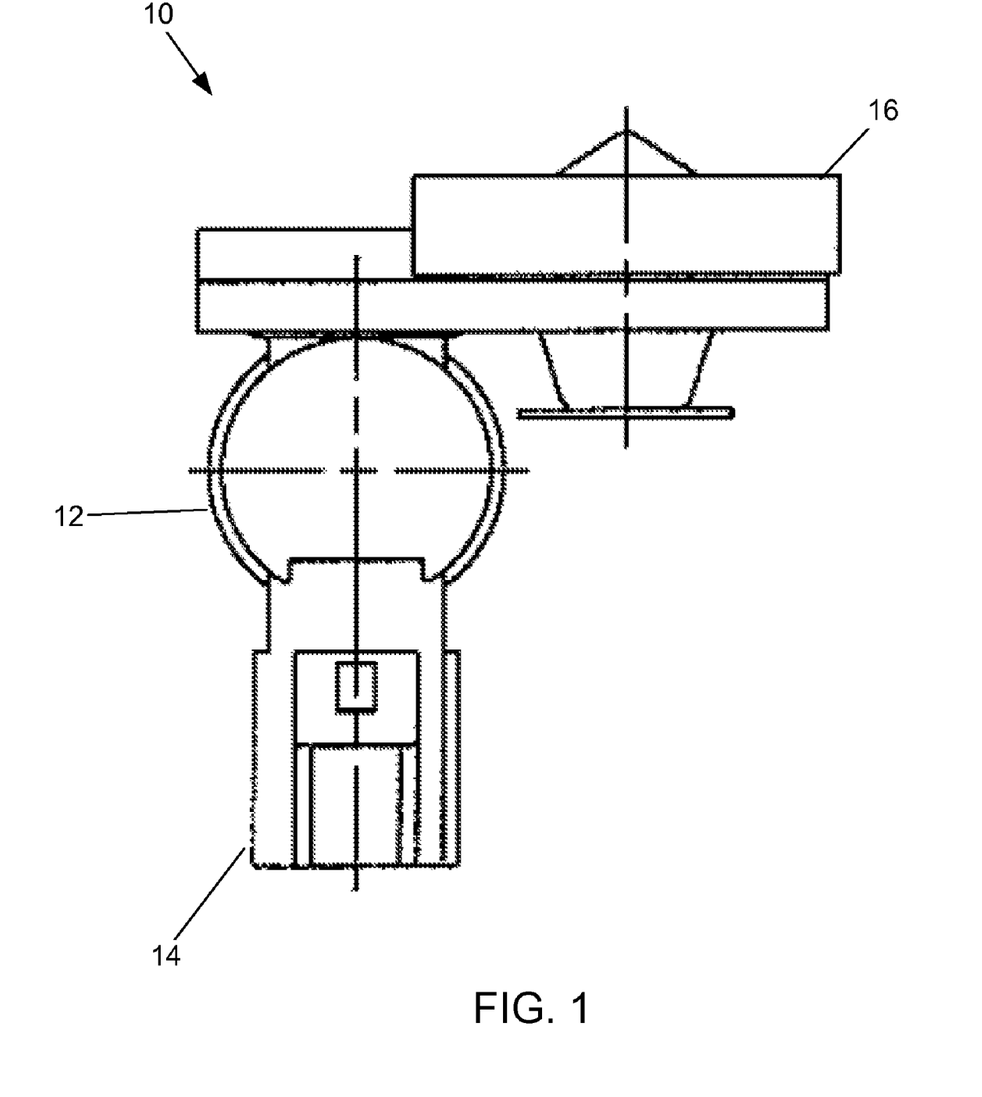
FIG. 1 is a top view of one exemplary embodiment of a vacuum solenoid valve consistent with the present disclosure.
Figure 2:
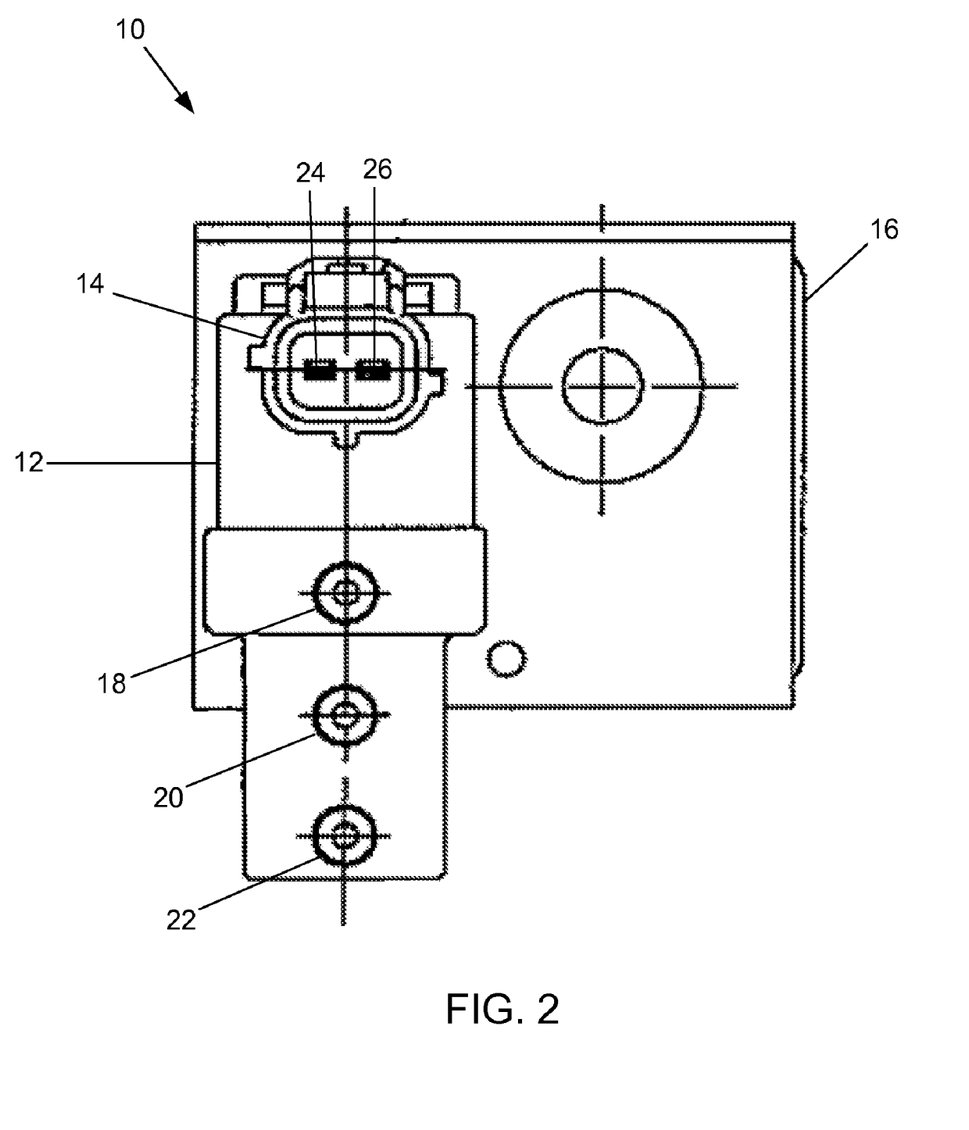
FIG. 2 is a front view of the vacuum solenoid valve shown in FIG. 1.
Figure 3:
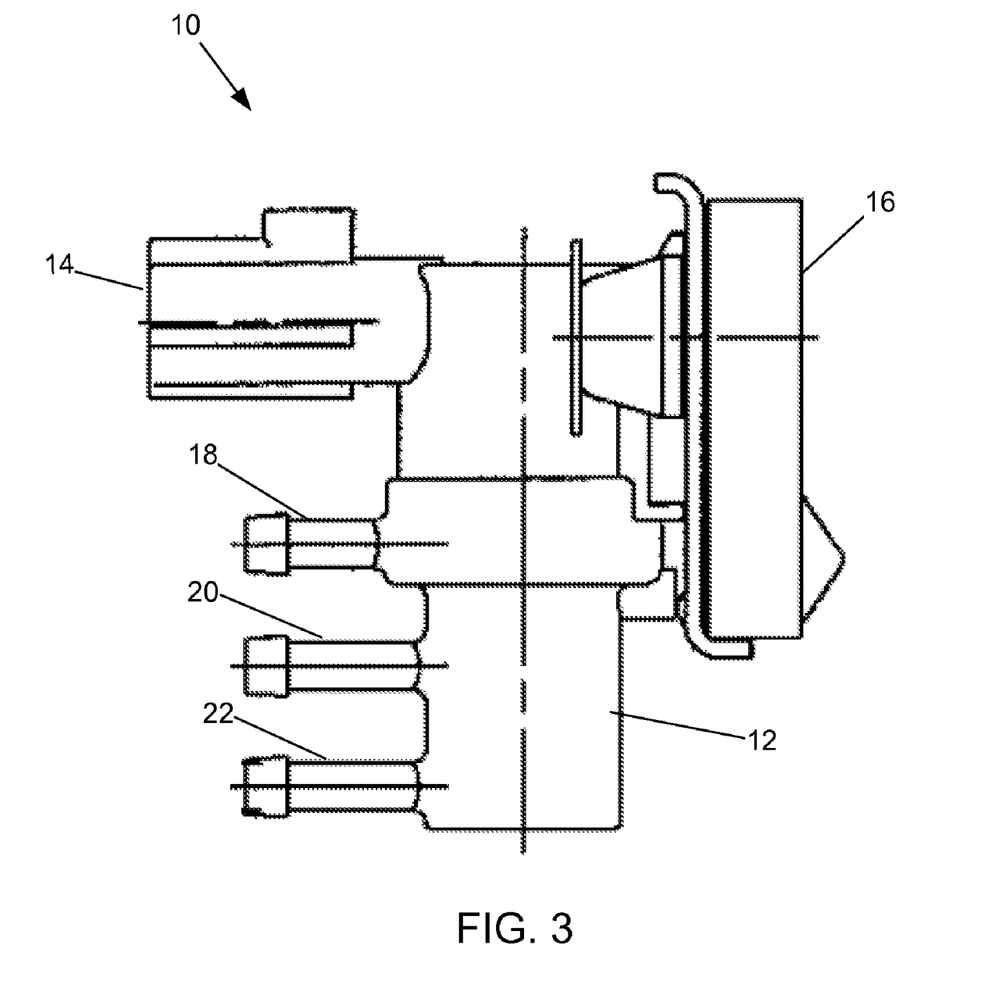
FIG. 3 is a side view of the vacuum solenoid valve shown in FIG. 1.

Referring to FIGS. 1 through 3, various views of an exemplary embodiment of a vacuum solenoid valve 10 consistent with the present disclosure are shown. Generally, a vacuum solenoid valve 10 may control vacuum or pressure supplied to an actuator, e.g., a vacuum actuator. For example, in one embodiment, the vacuum solenoid valve may control the vacuum supplied to a vacuum operated wastegate actuator. As shown, the vacuum solenoid valve 10 may generally include a valve body 12 and an electrical connector 14. The vacuum solenoid valve 10 may also include an isolator pad 16, which may facilitate mounting of the vacuum solenoid valve 10. As best seen in FIGS. 2 and 3, the vacuum solenoid valve 10 may also include a plurality of ports, for example, ports 18, 20, 22.

The electrical connector 14 may include one or more terminals 24, 26, e.g., for receiving a control signal from an engine management system, boost pressure sensor, etc. The ports 18, 20, 22 may variously be connected to a vacuum source, a vacuum actuator, such as a vacuum controlled wastegate, a pressure source, etc. The control signal received via the electrical connector 14 may open or close the various ports 18, 20, 22. For example, a first port, e.g., 18, may be coupled to a vacuum source and at least a second port, e.g., 22, may be coupled to a vacuum wastegate actuator. The vacuum solenoid valve 10 may be actuated to open the second port 22 relative to the first port 18 to apply a vacuum to the vacuum wastegate actuator, thereby opening a wastegate. Other arrangements of vacuum ports, actuators, etc., may suitably be employed in connection with the present disclosure.

Figure 4:
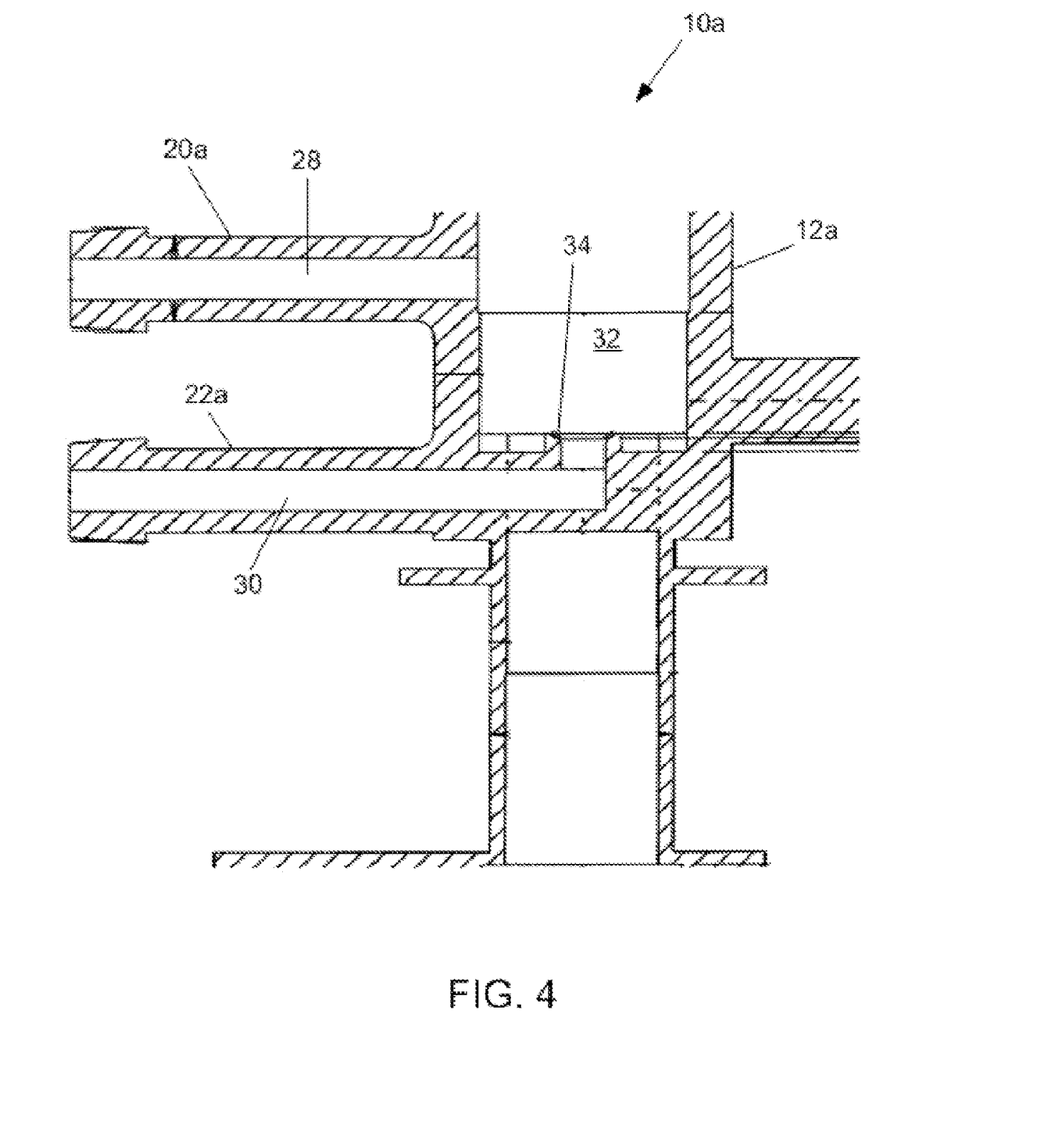
FIG. 4 is a detailed cross-sectional view of a portion of a vacuum solenoid valve consistent with the present disclosure, including a stainless steel valve seat.

With additional reference to FIG. 4, a detailed view of one embodiment of a portion of a vacuum solenoid valve 10a is shown. For example, the vacuum solenoid valve 10a may include a plurality of ports 20a, 22a including respective passages 28, 30 in fluid communication with an interior portion or cavity 32 of a valve body 12a (only a portion of which is shown). At least one of the ports (for example, but not limited to, port 22a) may include a valve seat 34, which may cooperate with a corresponding valve member (not shown) for opening and closing the passage 30 for fluid communication with the interior 32 of the valve body 12a, and, optionally, thereby opening and closing the passage 30 to fluid communication with one or more of the passages of one or more additional port (for example, but not limited to, passage 28 of port 20a). The valve body 12a, including the ports 20a, 22a, may be formed from a variety of materials for example, but not limited to, a polymeric material, such as nylon, etc. The polymeric material may include reinforcing materials and fillers, such as glass fiber, to increase the strength of the valve body 12a.

According to one aspect, the valve seat 34 may include a material which is resistant to wear, corrosion, and/or erosion. The wear, corrosion and/or erosion resistant valve seat 34 may exhibit less wear than may occur when the valve seat is formed from glass reinforced nylon, e.g., as part of the valve body 12a. The valve seat 34 may be insert injection molded during the formation of the valve body 12a. In various other embodiments, the valve seat 34 may be pressed, bonded, welded, etc., to the valve body 12a after the formation thereof. According to one embodiment, the valve seat 34 may be a stainless steel member, which may resist erosion and wear, as well as damage due to corrosion or other environmental factors. The resistance to erosion and wear may prolong the end of life durability of the vacuum solenoid valve 10a. Additionally, the stainless steel valve seat 34 may resist damage due to contaminants being driven into the valve seat 34 by the valve member during repeated opening and closing of the valve 10a. The valve seat 34 may also be formed from various other suitable metallic and non-metallic materials having a higher resistance to wear, erosion, and/or corrosion compared to the valve body 12a such as, but not limited to, titanium and titanium alloys, ceramic, and the like.

Figure 5:
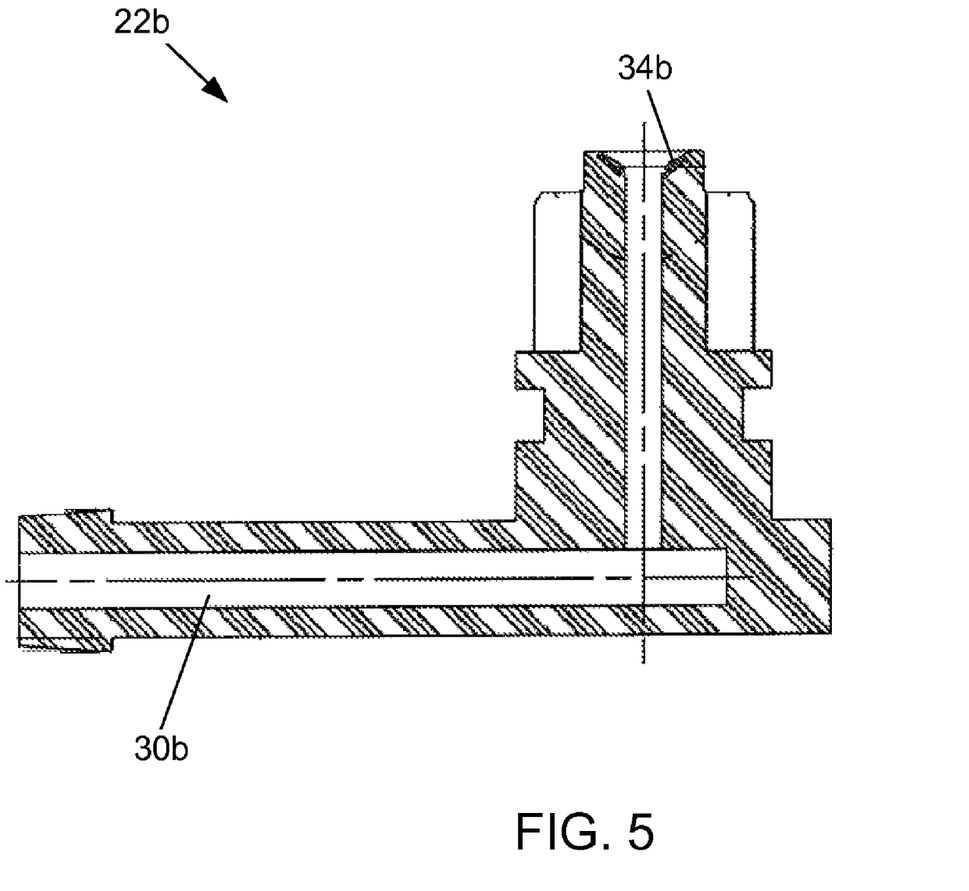
FIG. 5 is another detailed cross-sectional view of a portion of a vacuum solenoid valve consistent with the present disclosure, including a stainless steel valve seat.

Turning now to FIG. 5, one embodiment of a valve port 22b consistent with an aspect of the present disclosure is shown. The valve port 22b may be used, for example, in connection with a vacuum solenoid valve. For example, the valve port 22b may be formed as a separate element from the valve body which may be separately formed and assembled to the valve body of a vacuum solenoid valve, e.g., by insert molding, bonding, welding, etc. The valve port 22b may include a passage 30b, e.g., for providing fluid communication from the valve body. Similar to the vacuum solenoid valve 10a shown in FIG. 4, the valve port 22b may include a wear, corrosion and/or erosion resistant valve seat 34b. The valve seat 34b may be coupled to the valve port 22b and may include stainless steel, titanium and titanium alloys, ceramic or other suitable material having a higher resistance to wear, erosion, and/or corrosion compared to the valve body and/or the valve port 22b. For example, the valve seat 34b may be inserted molded with the valve port 22b, bonded thereto, press fit, etc. Consistent with such an embodiment, the valve port 22b may have a high end of life durability, due, at least in part, to the resistance of the valve seat 34b to wear, erosion, and/or corrosion.

According to yet another aspect, the present disclosure may include a valve member comprising a valve ball configured to sealingly engage with one or more valve seats for sealing, or closing, a corresponding port. According to this aspect, the valve ball may at least partially rotate during opening and/or closing of the port, e.g., as the valve ball moves into and/or out of engagement with a cooperating valve seat. The rotation of the ball may clean the ball, e.g., by dislodging contaminants, preventing or reducing the accumulation of contaminants, etc. According to one embodiment, the self cleaning ball may include a wear, erosion and/or corrosion resistant material. For example, the valve ball may comprise a material having a higher wear, erosion and/or corrosion resistance compared to the valve body such as, but not limited to, stainless steel, titanium, nickel, ceramics, polymeric materials, etc.

Figure 6:
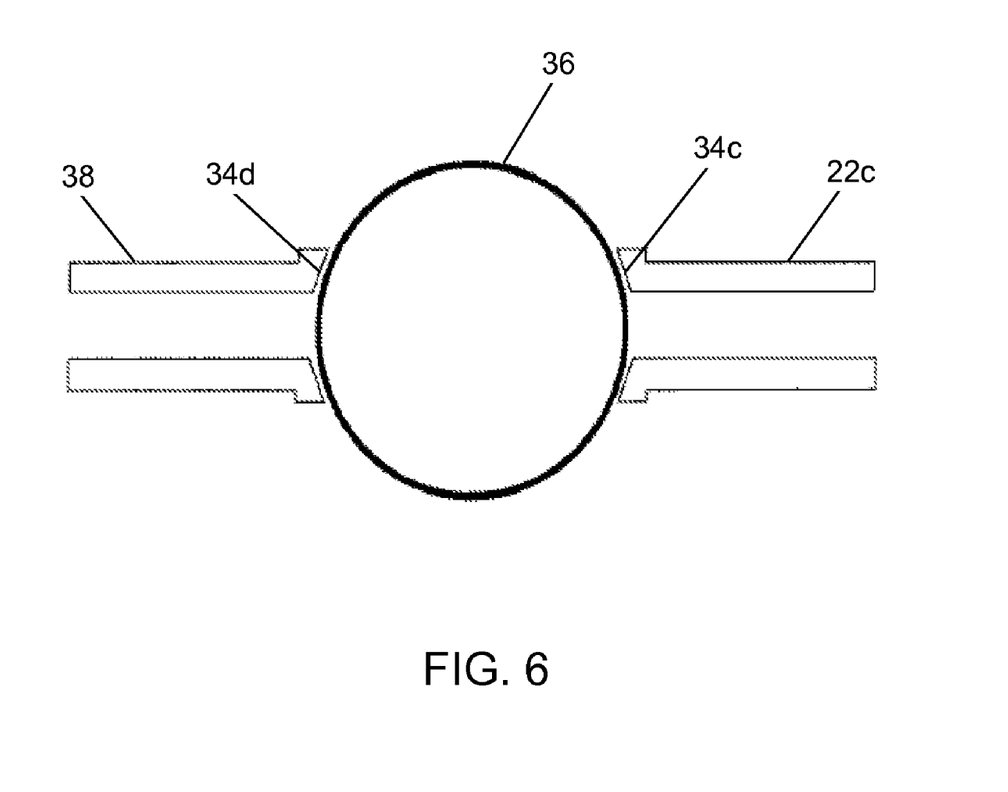
FIG. 6 schematically depicts a valve embodiment including a self cleaning ball, consistent with one aspect of the present disclosure.

Consistent with one embodiment of the foregoing, as shown in FIG. 6, the valve ball may comprise a ball bearing 36 configured to sealingly engage with one or more valve seats 34c, e.g., of a port 22c. The valve seat 34c may include a wear, corrosion or erosion resistant insert as discussed herein (for example, but not limited to, a stainless steel valve seat) or may be from another material (such as a conventional polymeric valve seat formed as part of the valve body or port). The ball bearing 36 may move into and out of engagement with the valve seat 34c to open and close the port 22c. As the ball bearing 36 moves into and out of engagement with the valve seat 34c, the ball bearing 36 may rotate, at least to some degree. The rotation of the ball bearing 36 may dislodge contaminants, and/or prevent or reduce the accumulation of contaminants on the ball 36 and/or on the valve seat 34c.

According to one embodiment, a second member 38 may be configured to also engage the ball 36. For example, the second member 38 may include a solenoid plunger, etc., which may be movable (for example by an actuator such as, but not limited to, an electromagnetic actuator, a hydraulic actuator, a pneumatic actuator, or the like) for urging the ball 36 into engagement with the valve seat 34c to seal the port 22c, i.e., to close the valve. Additionally (or alternatively), the second member 38 may be movable to allow the ball 36 to at least partially separate from the valve seat 34c for opening the port 22c. The second member 38 may be moveable in response to, at least in part, one or more control signals, for example, control signals received through the electrical connector discussed herein.

According to another embodiment, the second member 38 may include another port having a valve seat 34d which may sealingly engage with the ball 36. For example, one or both of the ports 22c, 38 may be movable relative to the ball 36 (for example by an actuator such as, but not limited to, an electromagnetic actuator, a hydraulic actuator, a pneumatic actuator, or the like) for urging the ball 36 into sealing engagement with the respective valve seats 34c, 34d and/or for releasing the ball 36 from sealing engagement with one or both of the valve seats 34c, 34d. One or both of the ports 22c, 38 may be moveable in response to, at least in part, one or more control signals, for example, control signals received through the electrical connector discussed herein.

According to one aspect of the present disclosure, the end of life durability of a vacuum solenoid valve consistent with the present disclosure may be substantially increased. For example, consistent with one embodiment of the present disclosure, it may be possible to achieve an end of life durability on the order of about 600 million cycles, as compared to approximately 4 million cycles exhibited by other vacuum solenoid valve designs. The end of life durability of a vacuum solenoid valve consistent with the present disclosure may be increased, at least in part, by reducing and/or eliminating valve seat erosion. According to another aspect, increased end of life durability may be achieved through reducing and/or eliminating the collection of contaminant at the valve seat.

In summary, according to a first aspect, the present disclosure may provide a vacuum solenoid valve which may exhibit increased end of life durability, providing a high number of operation cycles during the useful life thereof. The solenoid valve may include an erosion resistant valve seat which may permit a high number of opening and closing cycles while experiencing little or no erosion, e.g., as compared to conventional vacuum solenoid valve designs. In a particular embodiment, the erosion resistant valve seat may include a stainless steel member.

According to a second aspect, a vacuum solenoid valve may include a self cleaning ball, which may rotate during opening and closing of the valve, e.g., as the ball moves into and out of engagement with a valve seat. Rotation of the self cleaning ball may dislodge accumulated contaminants and/or prevent or reduce the accumulation of contaminants on the ball and/or on the valve seat. According to a particular embodiment, the self cleaning ball may include a stainless steel ball bearing. According to yet another aspect, the self cleaning ball may be used in conjunction with an erosion resistant valve seat. In one such particular embodiment, the self cleaning ball may include a stainless steel ball bearing which may be used in conjunction with a stainless steel valve seat to provided sealing and opening of the valve.

According to yet another aspect, the present disclosure may comprise a vacuum solenoid valve comprising a valve body defining an interior cavity and including a plurality of ports configured to be in fluid communication with the interior cavity of the valve body. At least one valve seat may be disposed about an opening between at least one of the plurality of ports and the interior cavity. The at least one valve seat may comprise a material having a higher resistance to wear and erosion compared to the valve body.

According to an additional aspect, the present disclosure may comprise a vacuum solenoid valve comprising a valve body defining an interior cavity and including a plurality of ports configured to be in fluid communication with the interior cavity of the valve body. At least one valve member may be configured to be moveably disposed within at least a portion of the interior cavity of the valve body and to sealingly engage with an opening of at least one port of the plurality of ports. The at least one valve member may comprise a material having a higher resistance to wear and erosion compared to the valve body.

According to a further aspect, the present disclosure may comprise a vacuum solenoid valve comprising a valve body defining an interior cavity and including a plurality of ports configured to be in fluid communication with the interior cavity of the valve body. At least one valve seat may be disposed about an opening between at least one of the plurality of ports and the interior cavity. Additionally, at least one valve member may be configured to be moveably disposed within at least a portion of the interior cavity of the valve body and to sealingly engage with the at least one valve member. The at least one valve seat and the at least one valve member may each comprise a material having a higher resistance to wear and erosion compared to valve body.

The features and aspects described with reference to particular embodiments disclosed herein may be susceptible to combination and/or application in various other embodiments described herein. Such combinations and/or applications of such described features and aspects to such other embodiments are contemplated herein. Additionally, the embodiments disclosed herein are susceptible to numerous variations and modifications without materially departing from the spirit of the disclosed subject matter. Accordingly, the present disclosure should not be considered to be limited to the particular embodiments disclosed herein.

What is claimed is:

1. A vacuum solenoid valve comprising:
   a valve body having an interior;
   at least one port in fluid communication with said interior;
   a separate port defining a passage in fluid communication with said interior of said valve body, said separate port being a separate element from said valve body and assembled to said valve body; and
   a valve seat coupled to said separate port between said passage and said interior of said valve body, said valve seat being positioned for cooperation with a valve member for opening and closing said passage to fluid communication with said interior of said valve body, said valve seat comprising a material having a higher resistance to wear compared to said separate port.

2. The vacuum solenoid valve of claim 1, wherein said separate port comprises a polymeric material.

3. The vacuum solenoid valve of claim 1, wherein said valve seat comprises stainless steel.

4. The vacuum solenoid valve of claim 1, wherein said valve seat comprises titanium.

5. The vacuum solenoid valve of claim 1, wherein said separate port comprises nylon and said at least one valve seat comprises stainless steel.

6. The vacuum solenoid valve of claim 1 wherein said valve member is configured to be moveably disposed within said interior of said valve body, wherein said valve member and said valve seat are configured to sealingly engage each other.

7. The vacuum solenoid valve of claim 6, wherein said valve member comprises a valve ball configured to at least partially rotate within said interior of said valve body as said valve ball moves into and out of sealing engagement with said valve seat.

8. The vacuum solenoid valve of claim 7 further comprising a solenoid plunger configured to urge said valve ball into or out of sealing engagement with said valve seat.

9. The vacuum solenoid valve of claim 7, wherein said at least one port comprises a second valve seat configured to sealingly engage with said valve ball, wherein at least one of said separate port and said at least one port is moveable relative to said valve ball to urge said valve ball into sealing engagement with at least one of said second valve seat and said valve seat.

10. The vacuum solenoid valve of claim 8, wherein said valve ball comprises a material having a higher resistance to wear and erosion compared to said valve body.

11. The vacuum solenoid valve of claim 10, wherein said valve ball comprises stainless steel.

12. The vacuum solenoid valve of claim 10, wherein said valve ball comprises titanium.

13. The vacuum solenoid valve of claim 1, wherein said assembly of said separate port to said valve body uses a process selected from the group consisting of molding, bonding and welding.

14. A vacuum solenoid valve comprising:
    a valve body having an interior;
    at least one port in fluid communication with said interior;
    a separate port defining a passage in fluid communication with said interior of said valve body, said separate port being a separate element from said valve body and assembled to said valve body;
    a valve seat coupled to said separate port between said passage and said interior of said valve body, said valve seat being positioned for cooperation with a valve member for opening and closing said passage to fluid communication with said interior of said valve body, said valve seat comprising a material having a higher resistance to wear and erosion compared to said separate port; and
    at least one valve member configured to be moveably disposed within said interior of said valve body and to sealingly engage with at least one opening of said at least one port and said separate port, said at least one valve member comprising a second material having a higher resistance to wear and erosion compared to said valve body.

15. The vacuum solenoid valve of claim 14, wherein said separate port comprises a polymeric material.

16. The vacuum solenoid valve of claim 14, wherein said at least one valve member comprises a valve ball configured to at least partially rotate within said interior of said valve body as said valve ball moves into and out of sealing engagement with said at least one opening.

17. The vacuum solenoid valve of claim 16, wherein said valve ball comprises stainless steel.

18. The vacuum solenoid valve of claim 16, wherein said valve ball comprises titanium.

19. The vacuum solenoid valve of claim 16, wherein said separate port comprises nylon and said valve ball comprises stainless steel.

20. The vacuum solenoid valve of claim 16 further comprising a solenoid plunger configured to urge said valve ball into or out of sealing engagement with said at least one opening.

21. The vacuum solenoid valve of claim 16, wherein said at least one port comprises a second valve seat configured to sealingly engage with said valve ball, wherein at least one of said separate port and said at least one port is moveable relative to said valve ball to urge said valve ball into sealing engagement with at least one of said second valve seat and said valve seat.

22. The vacuum solenoid valve of claim 14, wherein said assembly of said separate port to said valve body uses a process selected from the group consisting of molding, bonding and welding.

* * * * *